Patented Mar. 20, 1928.

1,663,323

UNITED STATES PATENT OFFICE.

WILFRED AMBROSE WHATMOUGH, OF FINCHLEY, ENGLAND.

PRODUCTION OF EMULSIONS.

No Drawing. Application filed May 14, 1927, Serial No. 191,546, and in Great Britain May 18, 1926.

This invention relates to the production of emulsions of oil or like liquid fatty substance in a dispersing medium of water of the kind in which the oil is added to the water in the presence of a protein.

It is well known to produce an emulsion by mixing an oil with casein which has been treated with an alkali in comparatively large proportion to render it soluble. Such treatment of casein with a large quantity of alkali produces alkali caseinate which is not a true protein and is not to be held to come within the term "protein" used in this specification.

In the production of an emulsion by mixing an oil with a protein solution it has been proposed to add a soap to the water phase for the purpose of improving the emulsification.

It has further been proposed to add to a boiling mixture of a protein in water, a solution of an oil in, for example, benzol, in the presence of a fatty acid in the oil and an alkali in the protein mixture. In such a process the boiling of the protein solution results in its coagulation or decomposition.

I have now discovered that emulsification takes place in the cold in a more satisfactory and rapid manner and that a more stable emulsion of oil in water results without the use of a solvent for the oil when a soap is produced in situ at the interface between the oil and the water in the presence of a protein such protein acting as a buffer in preventing undue variation in the electrolytic activity of the aqueous phase during the period of emulsification, and that the result also depends on the quantity of alkali in the aqueous phase.

The present invention therefore comprises a process for the production of an emulsion which consists in mixing with a fatty oil or like liquid fatty substance a small quantity of a higher and non-volatile fatty acid, and then mixing said mixture with water containing a protein with which a small quantity of an alkali has been mixed. The quantity of alkali is the amount requisite to make the electrolytic activity of the electrolyte or electrolytes in the aqueous phase such that the interfacial tension between the oil and water phases is sufficiently reduced to permit rapid or almost spontaneous emulsification.

In the normal way a concentration of 0.1 N alkali is sufficient but the amount is affected by other electrolytes which may be present, such as sodium phosphate and sodium chloride which also aid emulsification, and the concentration of alkali in the aqueous phase may vary between 0.01 N and the amount which is just insufficient to cause coagulation of the protein.

Examples of higher and non-volatile (i. e. will not distill in steam) fatty acids which may be employed are oleic acid and stearic acid, and the term "fatty acid" is to be understood to cover natural products containing a sufficiency of the fatty acid. Suitable protein solutions or mixtures comprise an aqueous extract containing cereal proteins, a concentrated separated milk, or a natural colloidal protein emulsion containing fat globules such as egg yolk. Prepared protein such as casein or gelatin may be used but it will require an addition of alkali to neutralize fermentation acids in order to bring the protein solution or mixture to the approximate iso-electric condition before adding the small quantity of alkali mentioned above. Nutrient essential salts may also be added providing the necessary ionic balance is restored by the addition of alkali or suitable acid.

Various alkalis may be employed; a caustic alkali such as caustic soda is preferred, but an alkaline salt, such as borax, may be used or in some circumstances, as for example, for toilet preparations an alkaline carbonate, such as sodium carbonate, may be employed.

A second feature of the invention consists in adding to the emulsion produced, water or water solutions such as a neutral solution of an essential mineral salt, e. g. iron citrate or sodium phosphate, to thin it or fruit or vegetable juices and/or a syrup or saccharine solution containing for example glucose, sucrose, maltose, invert sugar or mixtures thereof, such as honey, molasses or sugar syrup or a further quantity of a fatty acid, such as oleic acid, may be added to the emulsion.

According to a further feature of the invention the product is evaporated at a low temperature under a vacuum to remove excess water and also air bubbles, for the purpose of imparting good keeping properties.
An example of the preparation of an emulsion according to the present invention is as follows:—

To one ounce of a bran extract P$_H$7.0 is added and well mixed 1/16 of an ounce of a volumetric normal solution of sodium hydroxide. To two ounces of a fatty oil, such as codliver oil or olive oil, is added and mixed 10 minims of oleic acid, and there is then added 10 minims of a normal solution of caustic soda and the whole is well mixed.

The fatty oil mixture is then added gradually to the protein solution with continued mixing and stirring and preferably in a mixing machine. The emulsification of the oil with the alkalized protein proceeds quickly and readily. There is thus produced an emulsion which is a paste or cream and which may be used as a vitamin active food.

Water, fruit or vegetable juices, a saccharine solution, glycerine or mixtures thereof may be added. Orange juice is a suitable fruit juice, and may be added in the proportion of one ounce to the above emulsion. The syrup of saccharine solution constitutes flavouring and/or preservative material which is desirable particularly when the emulsion is employed as a food or medicinal preparation. For example, one ounce of honey may be added to the mixture set forth above.

For toilet preparations, and for water softening, an emulsion is prepared as above, but for example, from a 20% mixture of neutralized casein in water, and a further quantity of fatty acid such as oleic acid may be incorporated into the emulsion, amounting for example to half an ounce either in place of the water, fruit or vegetable juices, or saccharine solution or together therewith. The product will then be fluid or a cream according to the oil or fat and fatty acid used. Thus the oil or fat may be lard, lanolin, almond oil, olive oil or the like. Wax, such as paraffin wax, may be added for hardening purposes or a portion of the fatty oil or like fatty substance may be substituted by a hydrocarbon product, such as paraffin molle or paraffin liquidum.

The mixture is now heated in a vacuum apparatus at a temperature of about 140° F., this treatment resulting in the removal of surplus water and air bubbles. The temperature may vary somewhat, but it should not be so high as to destroy the protein or vitamin activity. This operation imparts good keeping properties to the product and enables the viscosity of the product to be controlled.

The relative proportions of the alkali added to the protein solution and to the fatty oil mixture may vary and that added to the fatty oil may in some circumstances be omitted, depending upon the appearance desired in the finished product. By diminishing the quantity of alkali added to the protein mixture or solution, and increasing that added to the fatty oil mixture, the emulsion may be made more opaque. The quantity and concentration of alkali added to the protein mixture or solution will always be insufficient to coagulate the protein.

As an example of a preparation of a transparent emulsion, to one ounce of egg yoke is added 30 minims of a volumetric normal solution of sodium hydroxide. 10 minims of oleic acid are mixed with one ounce of castor oil and this is then mixed with the alkalized egg yolk and the whole thoroughly mixed to produce a cream. There is then added one ounce of glucose syrup, and after mixing the product is finally evaporated under a vacuum until a clear emulsion is produced. It is found that the finely divided oil globules are almost invisible under the microscope.

The amount of fatty acid mixed with the fatty oil is sufficient to produce a neutral soap by combination with the free alkali and when mixed with neutral oils is usually approximately 1/3 part by volume of the total volumetric solution of alkali.

The emulsions produced by the process according to the present invention are particularly stable, and the preparations containing an excess of fatty acid are specially adapted for water softening since the said fatty acid precipitates lime salts. Further the said fatty acid neutralizes any free alkali in toilet soap.

It has been proposed to add an oil to a solution of a protein to form an emulsion then to add a flavouring material such as oil of cinnamon, then to pass the mixture through a homogenizer and then to dry it.

What I claim is:—

1. A process for the production of an emulsion consisting in mixing with a liquid fatty substance a small quantity of a higher and nonvolatile fatty acid and then mixing said mixture with water containing a neutralized casein with which a small quantity of an alkali has been mixed, said quantity being an amount such that the interfacial tension between the oil and water phases is sufficiently reduced to permit rapid and substantially spontaneous emulsification.

2. A process for the production of an emulsion consisting in mixing with a fatty oil a small quantity of oleic acid and then mixing said mixture with water containing neutralized casein to which a small quantity of an alkali has been mixed, said quantity being an amount such that the interfacial tension between the oil and water phases is sufficiently reduced to permit rapid and substantially spontaneous emulsification.

3. A process for the production of a clear emulsion consisting in mixing with a liquid fatty substance a small quantity of a higher and nonvolatile fatty acid, then mixing said mixture with water containing a neutralized casein with which a small quantity of an alkali has been mixed, said quantity being an amount such that the interfacial tension between the oil and water phases is sufficiently reduced to permit rapid and substantially spontaneous emulsification, then adding a saccharine solution and then evaporating the product at a low temperature under a vacuum.

Dated this 29th day of April, 1927.

WILFRED AMBROSE WHATMOUGH.